(No Model.) 5 Sheets—Sheet 1.

G. P. PARRADEE.
PHOTOGRAPHIC CAMERA.

No. 564,838. Patented July 28, 1896.

Witnesses:
Geo. P. Wightman
Jacob Gassman Jr

Inventor
George P. Parradee.
By, O. E. Hoddick.
Attorney.

(No Model.) 5 Sheets—Sheet 2.

G. P. PARRADEE.
PHOTOGRAPHIC CAMERA.

No. 564,838. Patented July 28, 1896.

Witnesses:
Geo. A. Wightman
Jacob Gassman Jr

Inventor:
George. P. Parradee.
By O. E. Hoddick.
Attorney (No Model.) 5 Sheets—Sheet 3.

G. P. PARRADEE.
PHOTOGRAPHIC CAMERA.

No. 564,838. Patented July 28, 1896.

Witnesses:
Geo. D. Wightman
Jacob Gassman Jr

Inventor
George P. Parradee.
By O. E. Hiddick.
Attorney.

(No Model.)  G. P. PARRADEE.  5 Sheets—Sheet 4.
PHOTOGRAPHIC CAMERA.

No. 564,838.  Patented July 28, 1896.

Witnesses:  Inventor.
Geo. P. Wightman  George P. Parradee.
Jacob Gassman Jr  By O. E. Hiddick.
  Attorney.

(No Model.) 5 Sheets—Sheet 5.
G. P. PARRADEE.
PHOTOGRAPHIC CAMERA.
No. 564,838. Patented July 28, 1896.
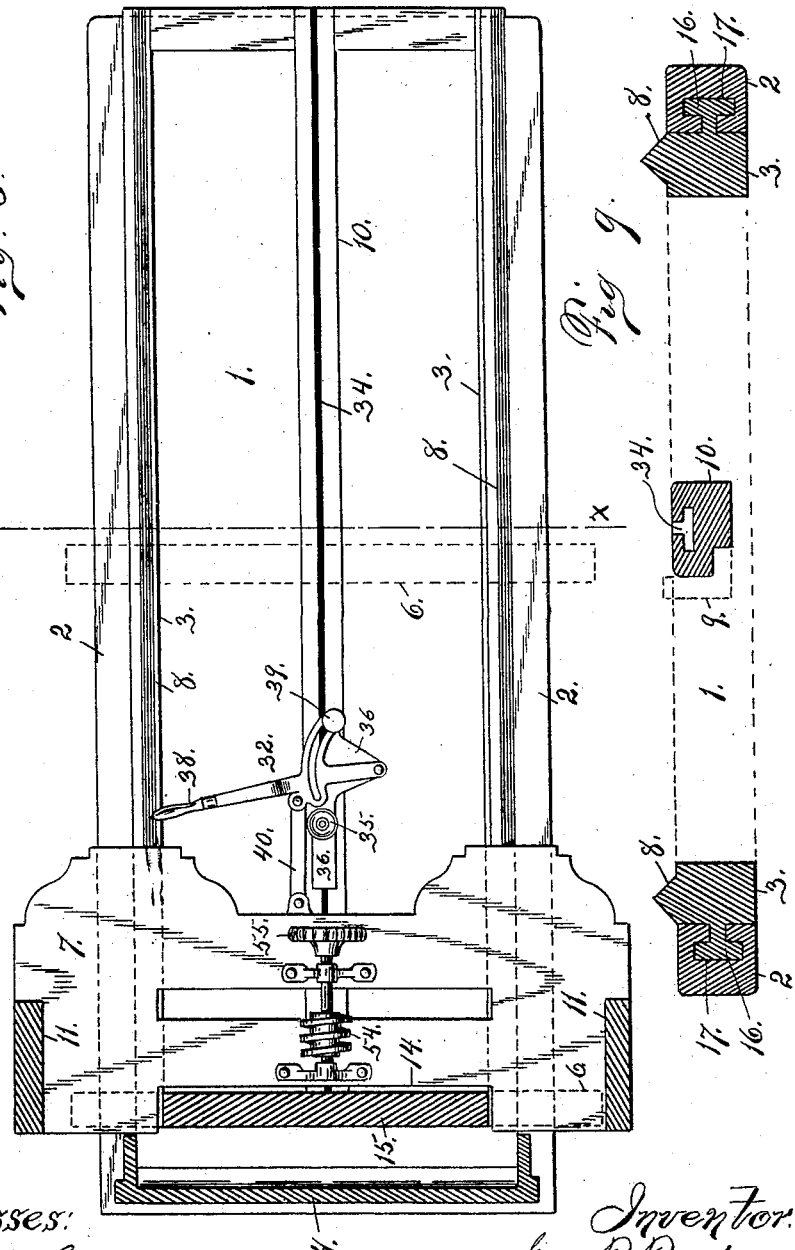
Witnesses:
Geo. D. Wightman
Jacob Gassman Jr
Inventor:
George P. Parradee,
By O. E. Hoddick.
Attorney.

UNITED STATES PATENT OFFICE.

GEORGE P. PARRADEE, OF BUFFALO, NEW YORK.

PHOTOGRAPHIC CAMERA.

SPECIFICATION forming part of Letters Patent No. 564,838, dated July 28, 1896.

Application filed May 4, 1895. Serial No. 548,156. (No model.)

*To all whom it may concern:*

Be it known that I, GEORGE P. PARRADEE, a citizen of the United States, residing at Buffalo, in the county of Erie and State of New York, have invented certain new and useful Improvements in Cameras; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to improvements in photographic cameras, and more particularly to that class of cameras employed for the production of half-tone negatives.

The object of my present invention is to produce a camera of the class above referred to in which the screen is always ready for operation. The casing may be enlarged or contracted, so as to produce an unusual focusing-range, and also containing other advantages over well-known cameras.

It consists, first, in a novel arrangement of the frames (in which the usual accordion-shaped casing is secured) by means of which the camera may be contracted to a very short focus; second, a focusing-lever which will admit of a large range of adjustment and at the same time permit the camera to be extended to the extreme end of the bed-frame; third, a pivoted ground-frame which may be adjusted vertically without affecting the point of focus.

It further consists in other details of its construction and combination of parts, all of which I will now proceed to more definitely describe, and then point out in the claims.

Figures 1, 7:
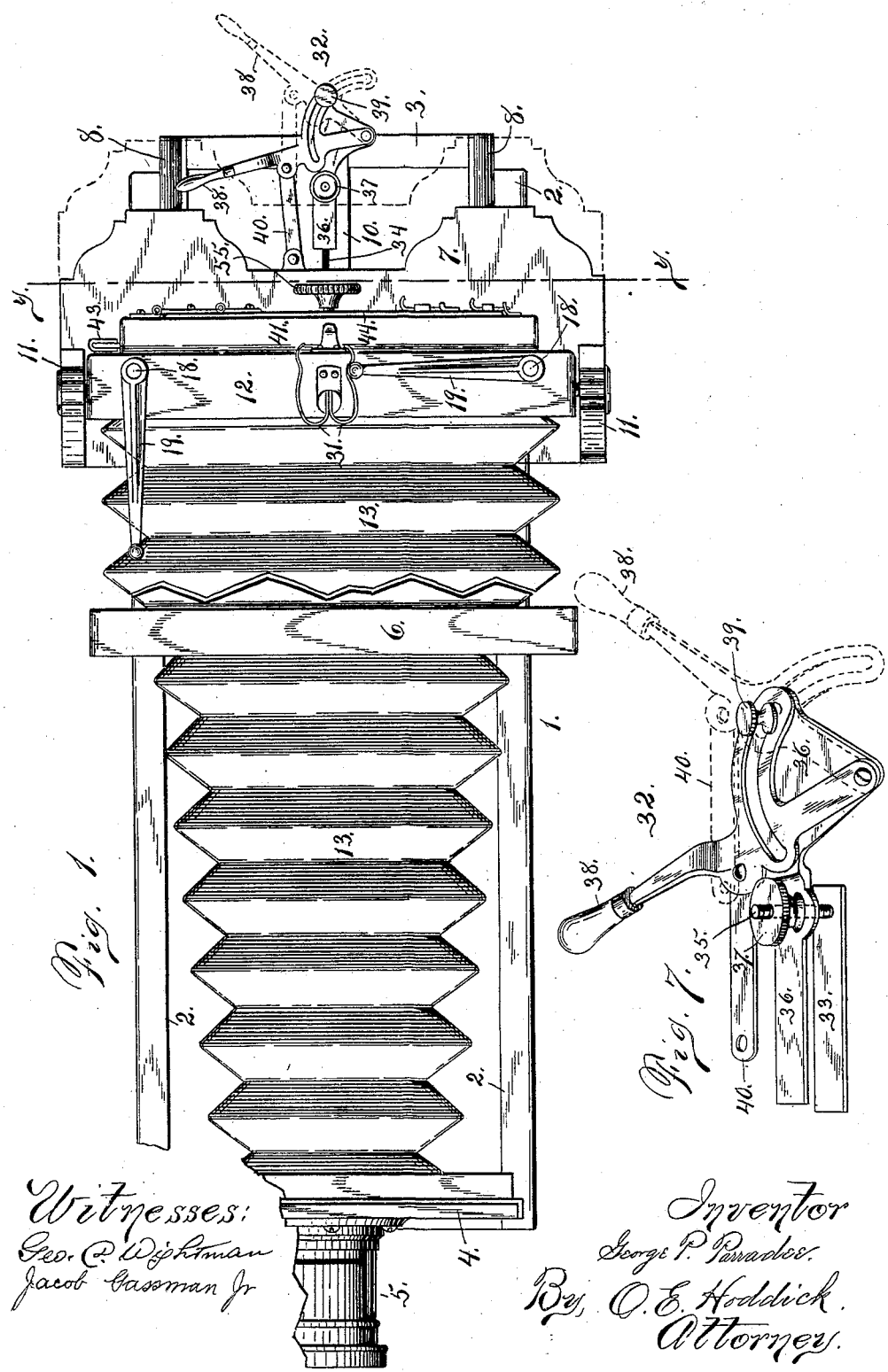
Figure 2:
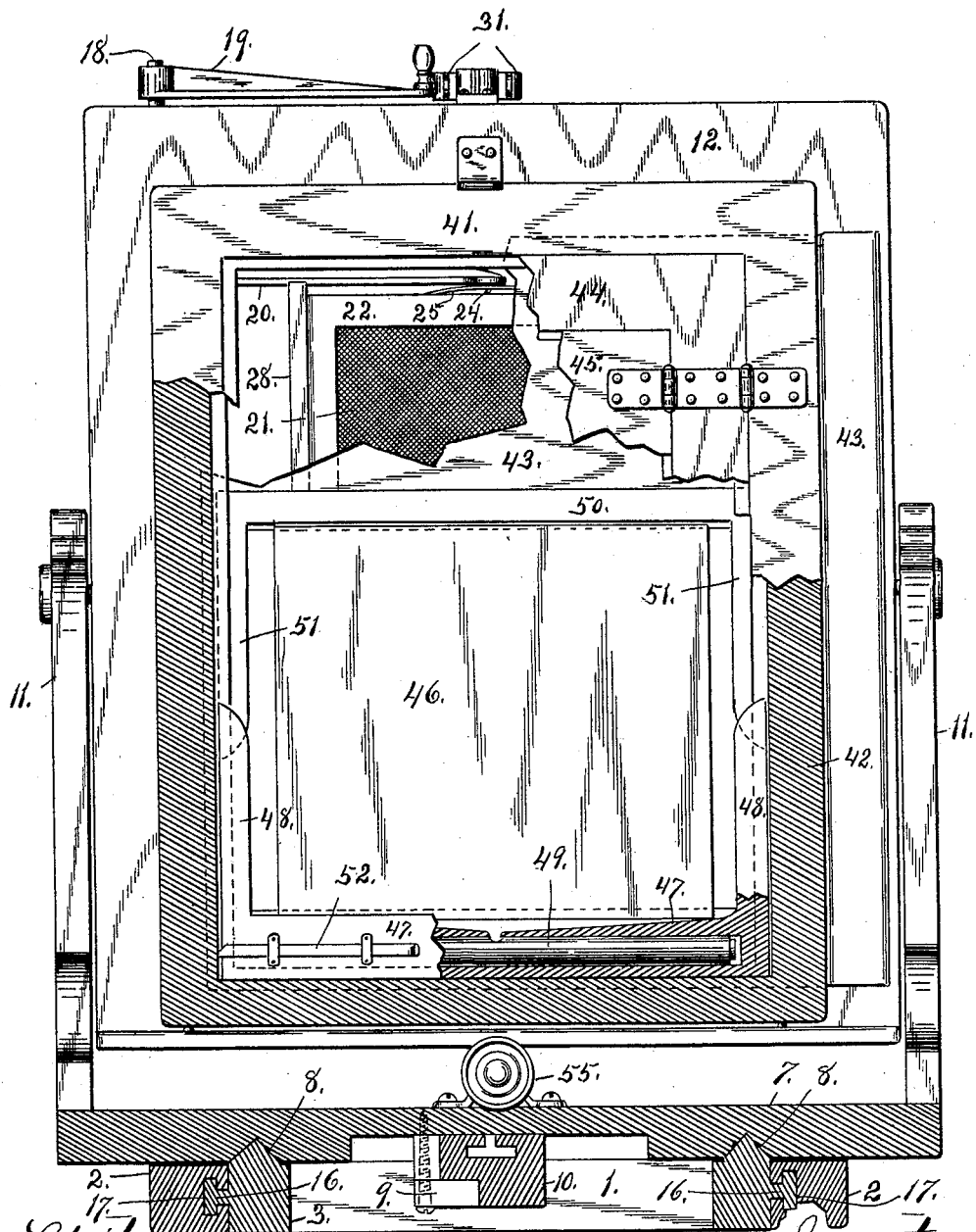
Figures 3, 4, 5:
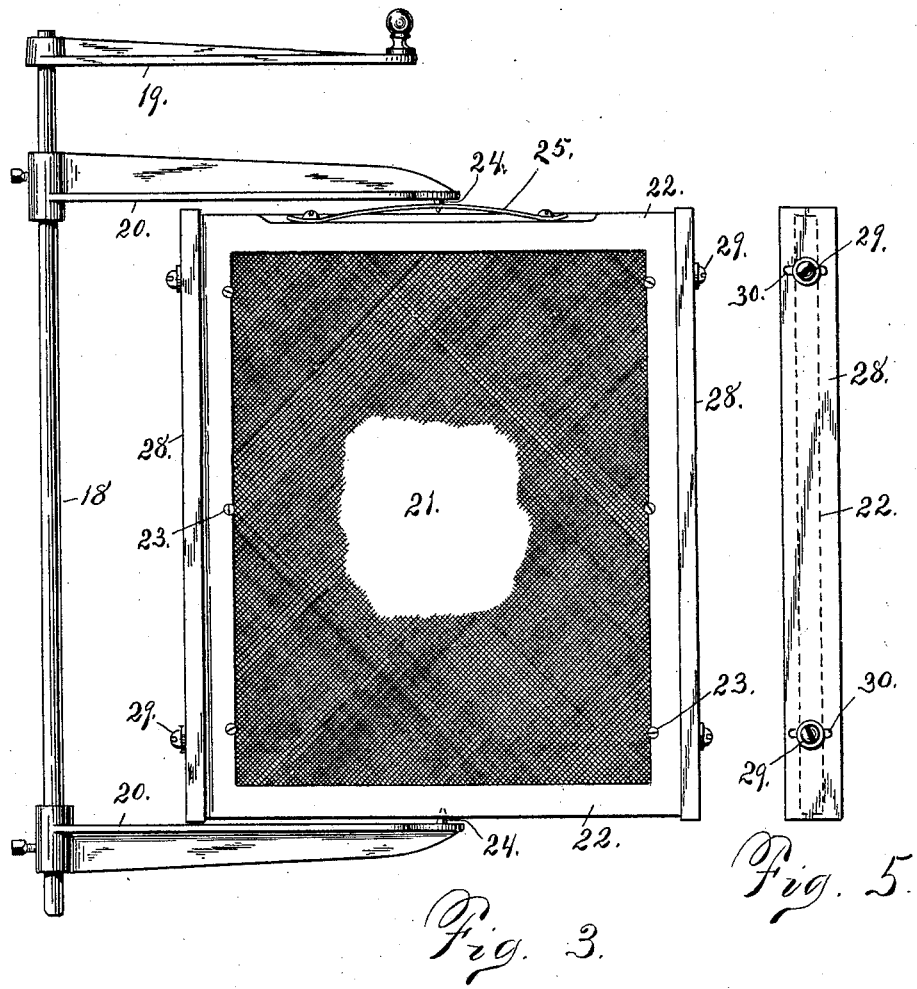
Figure 6:
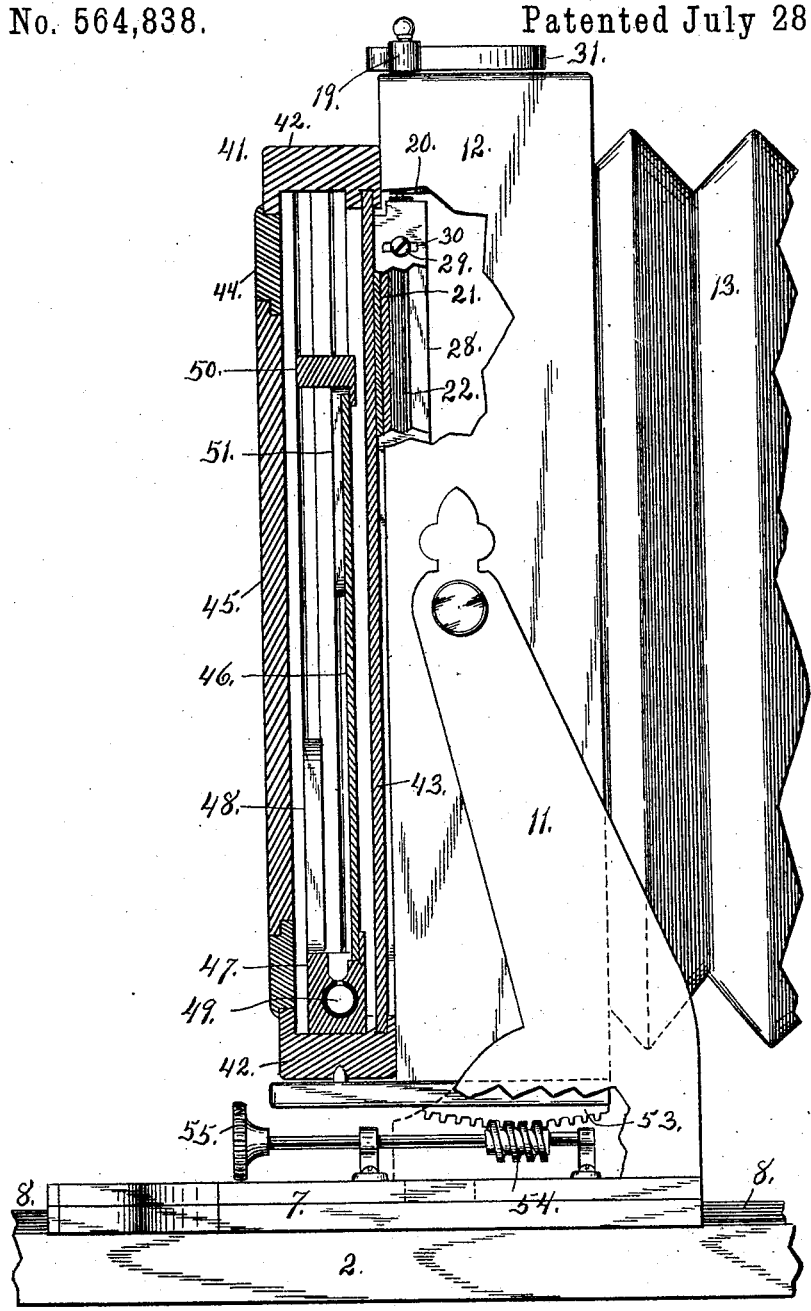

In the drawings, Figure 1 is a top plan view of a camera constructed according to my invention. Fig. 2 is a cross-section of the same, taken through the line Y Y, partially broken away to show relative position of parts. Figs. 3, 4, and 5 are detail views showing the half-tone screen and its carrying-arms. Fig. 6 is a side elevation of the rear pivoted frame, partially broken away to show adjusting mechanism. Fig. 7 is a detail view of the focusing-lever. Fig. 8 is a top plan view of the bed-frame; and Fig. 9 is a cross-section of the same, taken through the line X X.

Referring to the drawings, 1 is the bed-frame, which is formed of the outer frame 2 and inner frame 3. The frames 2 and 3 travel one within the other and are secured from lateral displacement by the T-shaped tongue 16, arranged on the longitudinal sides of the frame 3, which travel in the similar shaped grooves 17, cut in the frame 2. At the front of the frame 2 is secured the upright 4, to which the lens 5 is secured, and at the inner end of the frame 3 is secured the center or supporting frame 6, which travels with the frame 3.

7 is an adjustable platform which rests on the inclined ways 8, projecting from the frame 3, as shown in Fig. 2, and is secured from accidental displacement by the depending block 9, which engages with the longitudinal strip 10, centrally secured in the frame 3. Mounted upon this platform 7 are the brackets 11 11, in which the rear frame 12 is pivoted. The frames 12 and 6 and upright 4 are connected by the accordion-shaped casing 13.

It will be seen that the platform carrying the frame 12 is cut away, as at 14, and the frame 6 is contracted, as at 15, thus enabling the platform to pass under the frame 6, thus permitting the camera to be contracted to a very short focus. (See Fig. 8.)

Heretofore it has been the practice to secure the half-tone screen in the plate-holder. This arrangement causes considerable annoyance and delay to the operator, as it is essential to keep its surface perfectly clean, an operation made difficult by reason of the wet-plate necessarily used in the production of a half-tone film, and as a half-tone screen is the most expensive item of an operator's outfit great care must be taken in carrying it back and forth to the dark room. In the present invention I have overcome these objections by mounting the screen within the camera, where it is always ready for use, never comes in direct contact with the hands of the operator, and seldom requires cleaning. This is accomplished in the following manner:

18 is a vertical shaft mounted in the frame 12 and having its upper end protruding through the frame, to which end the operating-lever 19 is secured. Within the frame and mounted upon the shaft 18 are the carrying-arms 20. (See Fig. 3.) 21 is the screen, which consists of two plates of glass having the fine lines running at right angles to each other between them. This screen 21 is secured in the frame 22 by the screws 23, and the frame is adjustably secured between the carrying-arms 20 by the pins 24, the lever-pin engaging directly with the frame 22 and the upper pin engaging with the spring-plate 25. This spring-plate 25 is secured to the frame 22 by the screws 26, which pass loosely through the elongated openings 27, thus permitting the spring to be depressed, so as to disengage it from the pin. To the vertical edges of the frame 22 are secured the adjusting-strips 28 by the screws 29, which pass through the elongated openings 30, thus enabling the screen to be adjusted to and from the plate-holder, against which the strips 28 rest when an exposure is made.

In Fig. 1 I have shown two operating-levers 19, as it is sometimes desired in producing certain effects to expose a plate first through one screen and then through a second screen having different lines. This second screen and its operating connection is of similar construction to that just described, only being fitted to the opposite side of the frame 12. A flat tension-spring 31 is centrally mounted upon the frame 12 to hold the lever 19 in place while exposure is being made.

32 is the focusing-lever, which is arranged to travel with the platform 7. The plate 33 is fitted to travel in the groove 34, cut in the strip 10. Extending up from this plate 33 is the screw-threaded shank 35, which passes through the plate 36, resting upon the strip 10. These plates 33 and 36 are adjustable upon the strip 10, (and carry the frame 12 of the camera with them in operation,) and when a desired focus is approximately reached the plates are secured in position by the thumb-nut 37. To further adjust the camera to an exact focus, the lever 38 is employed.

It will be seen by reference to the drawings that this lever is adjustable within a certain radius, at any point of which the lever may be secured by the thumb-screw 39. A connecting-arm 40 connects the platform 7 with the focusing-lever. 41 is the plate-holder. This I am able to make very compact in form in view of the screen being dispensed with in this part. (See Figs. 2 and 6.) The holder consists of the frame 42, provided with the slide 43 at its front face and the hinged doors 44 and 45 at its rear.

46 is the negative-plate, which rests against a rabbet cut in the adjustable cross-piece 47. This cross-piece 47 is arranged to slide in grooves and is provided with projecting arms 48 to insure its horizontal position. A short rubber hose 49 is placed within this cross-piece 47, and is provided with a small hole at its center, through which it receives any silver which may fall from the wet-plate 46. A second cross-piece 50 is placed in the top of the holder, which is provided with depending arms 51. These arms 51 travel in separate grooves from the arms 48, thus permitting them to pass one another when a small plate is inserted, as seen in Fig. 2. A small catch 52 serves to hold the cross-piece 47 in position. Centrally secured to the bottom of the frame 12 is the rack-bar 53, which engages with the worm-gear 54, mounted upon the platform 7 and operated by the thumb-wheel 55. (See Fig. 6.) By means of this mechanism the frame 12 may be tilted in a forward or backward position, and as it is centrally pivoted in the brackets 11 the focus is not changed.

In operation, the chart, map, or article to be reproduced in half-tone is placed before the camera, the ground glass, as in all cameras, being placed before the rear frame. The article is now focused upon the ground glass at the desired size by the focusing-lever, as above described. The screen may now be brought into position against the ground glass, enabling the operator thus early to see the effect of the half-tone when complete. The ground glass is now removed and the plate-holder containing the wet-plate 46 is placed before the frame 12. The screen-operating lever 19 is now grasped with one hand and the slide 43 with the other, and as the slide is drawn out of the holder the screen is swung into place before the plate. The lens-cap is now removed and the exposure made. After exposure is complete the cap is again adjusted over the lens, the screen swung back out of the way by the operating-lever 19, and the slide returned to the plate-holder, thus inclosing the plate in the holder, whence it is taken to the dark room for further developing.

I claim—

1. In combination with a photographic camera the screen 21, mounted in the frame 22 and provided with adjusting-strips 28, said frame being centrally pivoted between the carrying-arms 20, which are in turn mounted upon the vertical shaft 18, said shaft projecting through the casing and provided with the operating-handle 19 by means of which the screen is carried to and from the plate-holder substantially as shown.

2. The herein-described photographic camera, having its rear frame mounted in brackets and being adjustably secured in place over a sliding platform and having its supporting-frame reduced at its lower end so as to permit the said platform to pass under it the whole being arranged to produce a short focus in a large camera substantially as shown.

In testimony whereof I have signed my name to this specification in the presence of two subscribing witnesses.

GEORGE P. PARRADEE.

Witnesses:
O. E. HODDICK,
DANIEL McINTOSH.